United States Patent [19]
Robinson

[11] 3,891,779
[45] June 24, 1975

[54] ASEPTIC PACKAGING OF FOODS
[75] Inventor: David V. Robinson, Laurel, Md.
[73] Assignee: Donald A. Rosini, Shamokin, Pa. ; a part interest
[22] Filed: Nov. 8, 1971
[21] Appl. No.: 196,837

Related U.S. Application Data
[62] Division of Ser. No. 53,087, July 8, 1970, abandoned.

[52] U.S. Cl. .................................. 426/399; 21/58
[51] Int. Cl. .............................................. A23l 3/02
[58] Field of Search ............ 99/211, 216, 215, 184;
    21/58; 426/326, 499, 521, , 324, 325, 335,
    400, 401, 404

[56] References Cited
UNITED STATES PATENTS
3,035,886   5/1962   Hickey ................................. 99/211
3,167,437   1/1965   Leviton ............................... 99/184
3,501,213   3/1970   Trexler .................................. 21/61

FOREIGN PATENTS OR APPLICATIONS
201,542   10/1955   Australia ............................. 99/211

Primary Examiner—A. Louis Monacell
Assistant Examiner—Hiram H. Bernstein

[57] ABSTRACT

A method is provided for producing an aseptically packaged food product in which the food is sterilized and then packaged under aseptic conditions in pre-sterilized containers. An apparatus for carrying out the method is provided.

10 Claims, 10 Drawing Figures

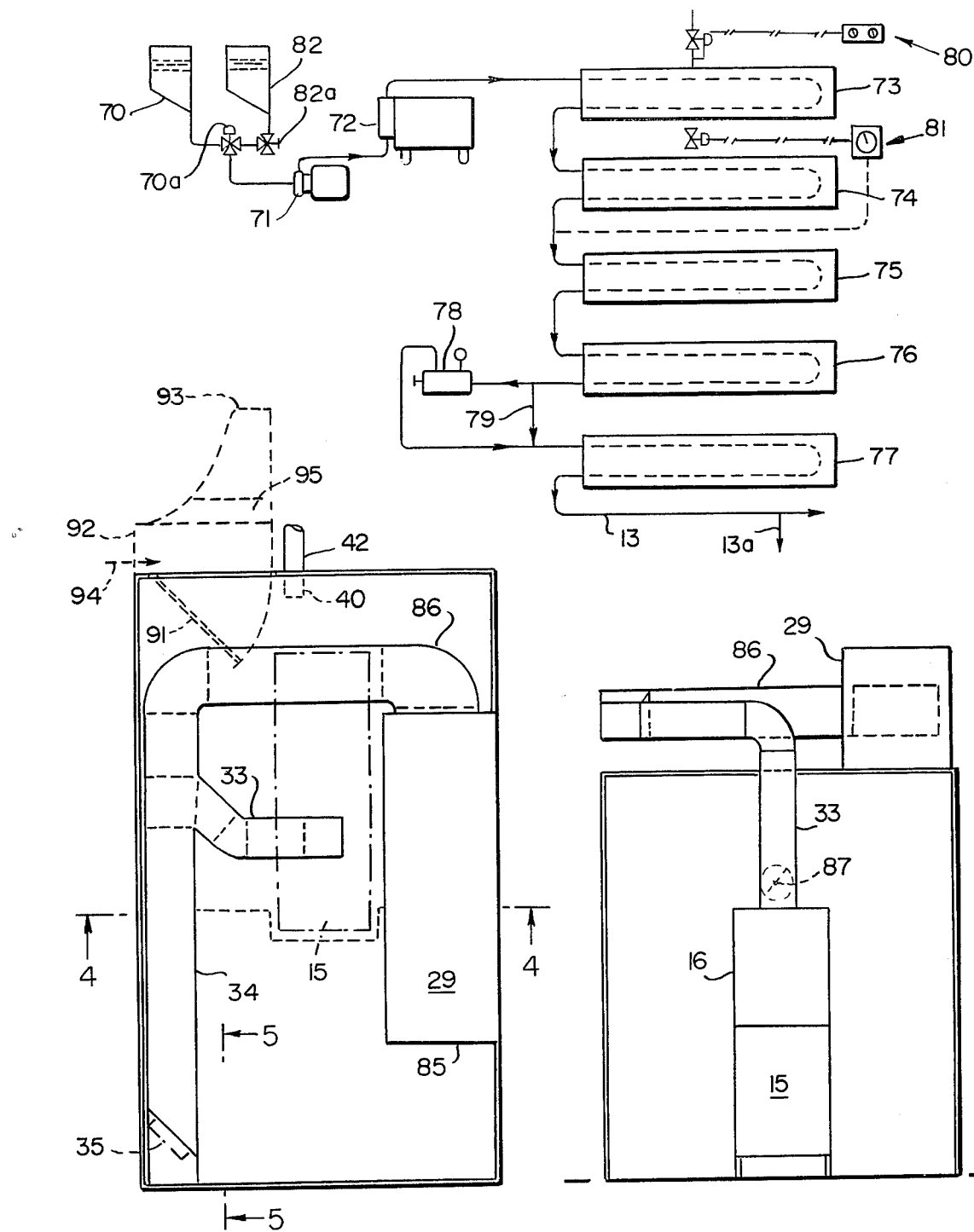

ASEPTIC PACKAGING OF FOODS

This is a division of application Ser. No. 53,087, filed July 8, 1970, now abandoned.

BACKGROUND OF THE INVENTION

1. The field of the invention is the aseptic packaging of food.

2. It is broadly old to sterilize a food and a container therefor in separate steps and then fill the container with the food. In one case, a container is sterilized by steam, applied externally thereof with the container open to atmosphere, and such treatment is continued during filling with sterilized food; and in another case, the container is sterilized by immersion in a sterilizing liquid and then preserved out of contact with the atmosphere until it is filled and capped. Both methods involve disadvantages, the one requiring live steam treatment even during filling, and the other requiring one or more immersion baths of a size capable of immersing a large number of containers followed by removal of the sterilizing liquid. So far as is known, no one discloses the aseptic packaging of foods as taught herein.

SUMMARY OF THE INVENTION

Generally speaking, the invention relates to the production of aseptic packaged food products comprising sterilizing the food, or taking a presterilized food, and aseptically packaging it in presterilized containers by carrying out the latter step in an atmosphere and environment in which microorganisms have been killed and in which the later entry and existence therein of microorganisms is prevented. Details and advantages of the packaging or filling operation are set forth below, but it may be noted that the food involved is one that in its non-sterile state is perishable if not refrigerated. The finished aseptically packaged food product, as produced herein, is storable without refrigeration, i.e., on shelves, for a period of time at least twice as long as the storage period of the refrigerated non-sterile food. Furthermore, the finished product does not require a chemical preservative to maintain long shelf life.

The invention is also of use for the aseptic packaging of materials useful in medicine and for the aseptic packaging of chemicals.

BRIEF DESCRIPTION OF THE DRAWINGS

The invention is illustrated in the accompanying drawings, in which

FIG. 2 is a flow diagram of a preferred way of sterilizing the food by heating the same;

FIG. 3 is a plan view of the top of the clean room showing air ducts and an air filter;

FIG. 4 is a section along line 4—4 of FIG. 3;

DESCRIPTION OF THE SPECIFIC EMBODIMENTS

Figure 1:
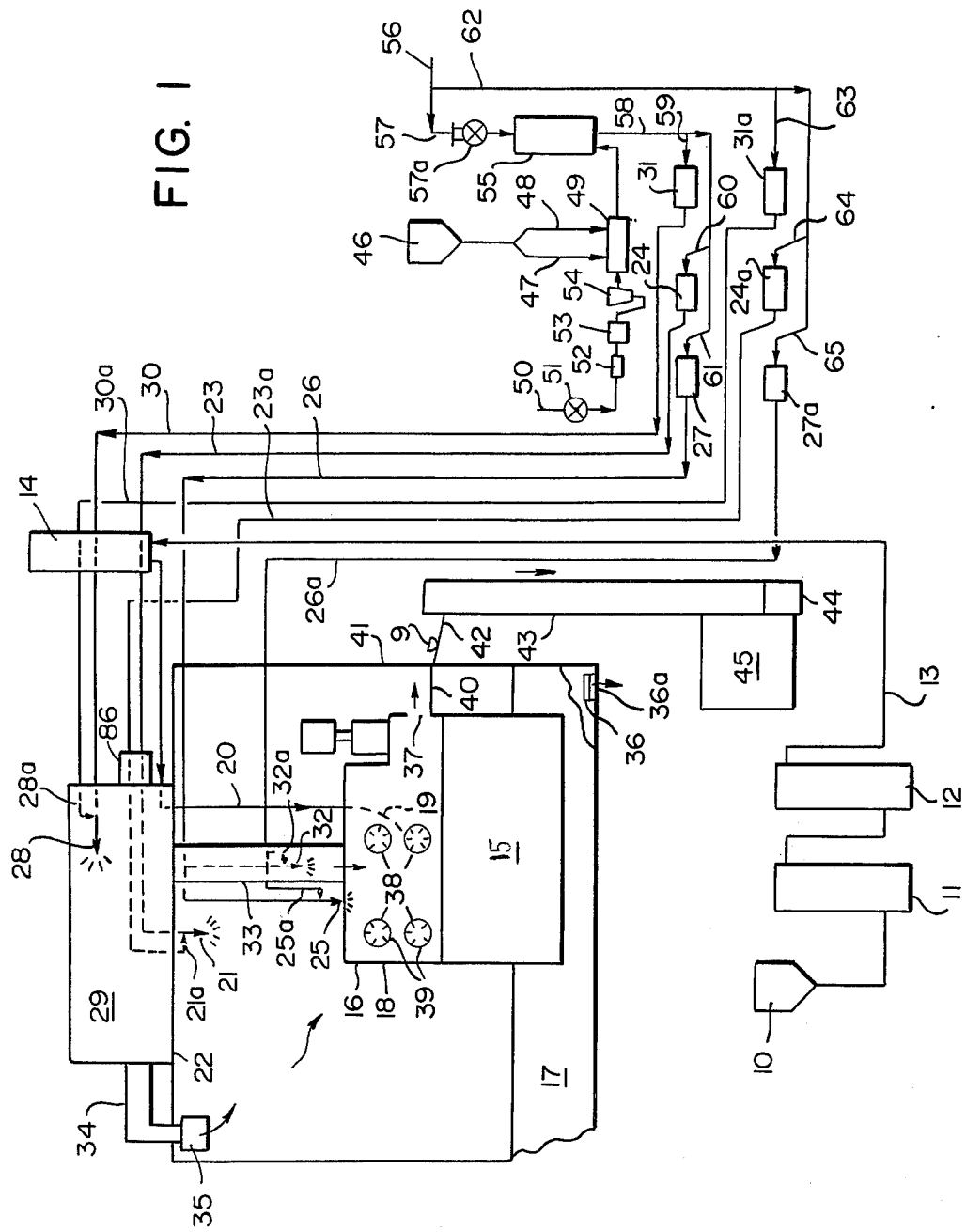
FIG. 1 is a flow diagram of the process showing the step of initially sterilizing a food and then aseptically packaging it in a clean room.

Referring to FIG. 1, 10 represents a feed hopper or surge tank for the food, which is a flowable one at ambient temperatures and pressures, and the hopper is preferably kept closed to minimize contact of the food with the atmosphere. Means for sterilizing the food is shown at 11, preferably comprising a heater for heating the food to a microorganism-killing temperature for a time sufficiently long to kill all microorganisms therein. The food is transferred to zone 11, as by a presterilized pump (FIG. 2) or by gravity, and is cooled in presterilized cooling zone 12. It is then passed by presterilized line 13 to a presterilized reservoir or surge tank 14, which is preferably formed with smooth interior wall surfaces. At 15 is a filling machine, having a filling zone 16, disposed in a completely walled pressure-sealed clean room 17. A transparent cover or shield 18 encloses the filling zone, and at 19 filling means are shown to which the reservoir 14 is connected by line 20, suitably valved. Before food material is drawn from the reservoir, and even before it is charged to hopper 10 and sterilized, it will be appreciated that the filling machine and clean room are sterilized to kill all microorganisms and that steps are taken to prevent the subsequent entry and existence therein of microorganisms, in accordance with the invention. These operations will be described next, after which the operation of the filling machine will be described.

In order to kill all microorganisms in the clean room and filling zone, all surfaces and the atmosphere thereof are sprayed with a microorganism-killing agent, preferably one dissolved in a solution, such as an aqueous solution, and such spraying is carried out for a time sufficiently long to kill all microorganisms present. Spray means, comprising a conventional spray nozzle, is disposed at 21 in or adjacent the ceiling 22 of the clean room, being effective to spray the entire room, and is supplied with solution by line 23 controlled by valve 24, the latter suitably being a solenoid valve. Another spray means is at 25 in the top of the cover 18; it is effective to spray the entire filling zone, and is supplied by line 26 controlled by valve 27. Another spray means is at 28, being disposed in an air filter 29 and functioning to sterilize inner surfaces of the filter and of the ducts (described below) which lead away from the same; it is supplied by line 30 controlled by valve 31. Still another spray means is at 32 in a duct 33 connecting the air filter to the filling zone 18; it is also supplied by line 26 controlled by valve 27. It is possible to omit spray means 25 and to relay on 32 to sterilize not only duct 33 but also the entire filling zone 18.

To aid the spraying action, high pressure air is delivered to each spray nozzle at a point effective to atomize or disperse the spray solution as it emerges from the nozzle. Thus, spray 21 receives air from a nozzle or inlet 21a on air line 23a controlled by valve 24a; spray 25 receives air from a nozzle 25a on air line 26a controlled by valve 27a; spray 28 receives air from a nozzle 28a on air line 30a controlled by valve 31a; and spray 32 receives air from nozzle 32a on air line 26a controlled by valve 27a.

Following the spraying, the clean room and filling zone are swept with sterilized air streams or laminations to keep away microorganisms from the food, these streams serving to entrain and remove any microorganisms that may be still present in the atmosphere or that may be brought in by the attendant for the filling machine. To this end there is provided, besides the duct 33, an air duct 34 which connects air filter 29 to the clean room, the connection terminating in air inlet means 35 in an upper portion of the clean room. A blower, not shown, is disposed in the air filter, and the latter has an air inlet, not shown, in the left end thereof as seen in FIG. 1. The filter unit, together with its blower, acts to supply the clean room and filling zone with continuous streams of filtered air, and this air is also sterilized since it passes over presterilized surfaces of the filter, duct 34, clean room, duct 33, and filling zone. As described below, the preferred microorganism-killing solution deposits a microorganism-killing residue on these surfaces. The air leaves the clean room via an opening 36 in a lower portion thereof, this opening preferably being disposed sustantially diagonally opposite the air inlet 35; the location of these openings 35 and 36 provide for the flow of air over the surfaces of the filling machine, then over an attendant for the same, and finally out of the clean room, the air passing in a descending diagonal path from the upper left hand far corner to the lower right hand near corner. In this way, any microorganisms on and adjacent the attendant are picked up in the air stream and moved away from the filling machine. Any other suitable path or paths may of course be employed so long as they achieve a similar result.

Entry of any microorganisms into the clean room from the atmosphere outside it is prevented by maintaining in the room a slightly superatmospheric pressure, and this may be achieved by providing a conventional counterweighted closure, generally indicated at 36a, for the exit 36. Thus, the superatmospheric pressure may range up to a few hundredths or up to a few tenths p.s.i.g. The walls of the clean room, which are described in more detail below, are made to withstand pressures of this order, but to avoid an excessive pressure build up, the walls are so constructed that they will yield at junction lines and leak air if the pressure increases appreciably over the superatmospheric values described.

Air entering the filling zone via duct 33 is removed through an opening 37 in the product discharge end of the filling zone.

The described air flows through the clean room and filling zone begin at the conclusion of the spraying period and continue throughout the operation of filling containers with food, or as long as the attendant is operating the filling machine.

Returning now to a consideration of the bulk food, it was indicated above that the food was sterilized in zone 11, as by heating, cooled in zone 12, and passed to reservoir 14. With the filling machine attendant in position, and the described air streams in motion, food from reservoir 14 is passed through line 20 to the filling means 19 in the filling zone 16. Filling means 19 suitably comprises a valved food discharge tube. A stack of sterilized containers and a stack of sterilized lids (sterilized as described below) are aseptically introduced into the filling zone, the cover 18 of which is provided with a closable opening (FIG. 6) to permit this maneuver by the attendant. Zone 16 also has in one side thereof a plurality of openings 38, each having sealed to the wall margins thereof a flexible glove 39 which extends into the filling zone and which enables the attendant to position the containers and lids in an aseptic manner.

The filling machine 15 has certain features which are conventional, and these include means for intermittently advancing the containers to the filling means 19, then to lid-applying means (FIG. 6), then to lid-sealing means, and then out of the filling zone by off-loading means. By use of these features and structures, the containers are filled, capped, and sealed, and delivered from the machine.

According to the invention, the sealed containers are passed through the opening 37 in the filling zone, then over a support 40, then through closable discharge means, indicated at 41, then along support 42 to a moving conveyor 43 operated by motor 44, which takes them to a temporary storage platform 45. One of the containers, indicated at 9, is shown on the support 42.

Returning to the microorganism-killing solution, this may be purchased and supplied to the valves 27, 24, and 31 (FIG. 1), or, as is preferred, it may be prepared in situ. For the latter operation, a tank 46 of microorganism-killing agent is provided from which agent is passed by lines 47 and 48 to a proportionometer or metering pump 49. Water from supply line 50 is also passed to the proportionometer, after first flowing through valve 51, check valve 52, solenoid valve 53, and vacuum breaker 54. The proportionometer mixes the agent and water in predetermined amounts and delivers the resulting microorganism-killing solution to a chamber 55 where a stream of pressurized air from lines 56 and 57 entrains the solution and delivers it by lines 58, 59, 60, and 61 to the valve 31, 24, and 27, respectively. A portion of the air stream in line 56 is diverted through line 62 and is passed to the valves 31a, 24a, and 27a by lines 63, 64, and 65, respectively.

It may be noted that the chamber 55 is equipped with two conventional electric probes (not shown) which extend downwardly through the top of the chamber, a low level probe and a high level probe, which together control the flow of solution into the chamber. One of these probes is long, reaching down to within a few inches of the bottom, and the other is short, reaching down only a few inches from the top. When the liquid level in chamber 55 falls below the lower probe, solenoid valve 53 is activated by means not shown and opens to allow water to pass through meter 49 and at the same time agent from tank 46 is drawn through the meter; thus, the solution in chamber 55 is replenished. Coincidently with the opening of valve 53, an air pressurization solenoid 57a in line 57 is inactivated, and closes, so that solution may enter chamber 55. When the solution makes contact with the upper probe in the chamber, solenoid 53 closes, thereby shutting off the flow of solution, and solenoid 57a opens to enable air to entrain the solution, as described.

Regarding the check valve 52, this serves to prevent any solution from passing back into the water supply line 50. The vacuum breaker 54 exhausts any air that may find its way into the system between valve 53 and the meter 49. The solenoid valves 27, 24, 31, 27a, 24a, and 31a may be activated manually, as by means of toggle switches; and it is preferable to activate valves 27 and 27a from a single switch so that pressurized solution and a supply of atomizing air are delivered from the fogging nozzle 25. Similarly, valves 24 and 24a, and 31 and 31a, are also activated in pairs. These solenoid valves can be activated all together, or each can be activated independently of the others; and activation can be done at any time before or during operation of the filling machine. However, once filling is underway, it is desirable not to use the spray nozzles and thus one can avoid any chance of getting solution into the food product or the containers. It is feasible to operate the solenoid valves automatically in a timed cycle of operation.

A preferred method of heating the bulk food to sterilize it is illustrated in the flow diagram of FIG. 2 where the food in the covered hopper 70 is moved by transfer pump 71, which may be a centrifugal pump, to a piston type timing pump 72 which then transfers it through the rest of the units of FIG. 2 and to the filling machine 15. From pump 72 the food passes through preheater 73, heater 74, holding unit 75, precooler 76, and final cooler 77. These units are preferably tubular heat exchangers in which heat exchange is carried out indirectly. The preheater is heated by hot water or steam, and the heater by stem, and the precooler may be cooled by tower or well water, and the final cooler by refrigerated water. Holding tube 75 is not heated except by the heated food passing therethrough. If homogenization of the food is desired, or necessary, it may be accomplished after sterilization by passing the food through a homogenizing valve 78 placed just ahead of the final cooler, and if not required or desired, the valve may be bypassed by line 79. A separate unit, instead of a valve, may be used as the homogenizer. Associated with preheater 73 is a conventional automatic control, indicated at 80, which regulates the temperature within predetermined limits, and at 81 there is provided a controlling and recording device for the heater 74.

Foods may be heated from about 40 to about 300°F., held at the latter temperature, and cooled back to temperatures as low as 40°F. if desired. As is known, microorganism-killing temperatures depend on time; typically, the temperature may range from 230°F. and a holding time of 200 minutes to a temperature of 300°F. and a holding time of 0.03 minutes. A usual temperature range is 280°F. for 30 seconds to 300°F. for 1 or 2 seconds.

The sterilizing system of FIG. 2 is generally applicable to flowable foods, and particularly to fairly fluid materials like milk, cream, juices, baby formulas, gravies, purees, sauces, flavored drinks, and the like.

It will be understood that prior to use the units shown in FIG. 2 will be sterilized. This may be accomplished by passing water from tank 82 through all units and heating the water to microorganism-killing temperature; if necessary, such heated water may be recirculated through the units by connecting line 13 to the tanks 70 and 82. Presterilization of line 13, surge tank 14, fill line 20, and filling means 19 may also be accomplished in this way, taking care to dispose of the hot water (or steam) issuing from filling means 19 as by recirculating it or discarding the same.

As described above, the sterilized food leaves final cooler 77 by line 13 for introduction to the surge tank 14, note FIG. 1.

Figure 5:
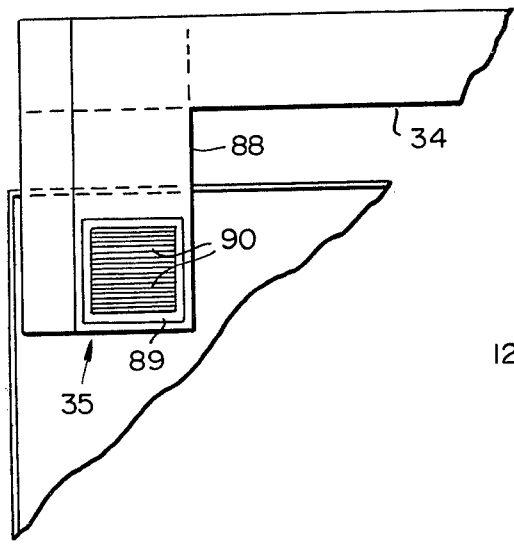
FIG. 5 is a section along line 5—5 of FIG. 3.

Turning now to FIGS. 3, 4, and 5, these views show the structures on the top of the clean room, including the air filter 29 together with associated ducts. Atmospheric air enters the filter at the end 85 and leaves by duct 86 which conducts filtered sterilized air to ducts 33 and 34. Duct 33 passes air into the filling zone 16, as described, while duct 34 conveys air to the air inlet means 35, also as described. Duct 33 has at 87 (FIG. 4) a movable air deflector or damper valve for regulating the quantity of air that enters the filling zone. Duct 34 (FIG. 5) is connected to the air inlet 35 by a short vertically extending duct 88. Inlet 35 comprises an air supply register 89 having a plurality of louvres 90 which are movable, as by a motor not shown, to four or more different positions to deflect the airflow in as many different directions. The register is equipped with a volume control damper, not shown.

Entry into the clean room is by means of the door indicated at 91.

At 92 an optional structure is shown comprising an outcove or anteroom which is constructed in substantially the same manner as the clean room, as described below. Access to the anteroom is by a door indicated at 93. This room is pressurized at a slightly lower pressure, say 0.05 to 0.1 or 0.2 p.s.i.g. lower, than the clean room, and is presterilized by spraying, note spray nozzle 94, in the manner described for the clean room. The atmosphere in the anteroom constitutes the outflow from the clean room, part of such outflow also being passed through the opening 36. The atmosphere in the anteroom passes through door 93 to the outside environment. The anteroom is useful for permitting the filling machine attendant to change into clean hospital-type clothing so that any contamination from his street clothing is not carried into the clean room. A foot bath 95, which may contain the same micororganism-killing solution described above, is maintained at the entry to the clean room through which the operator must pass in order to enter the latter, and in this way the surfaces of his hospital-type boots are sterilized.

Figure 6A:
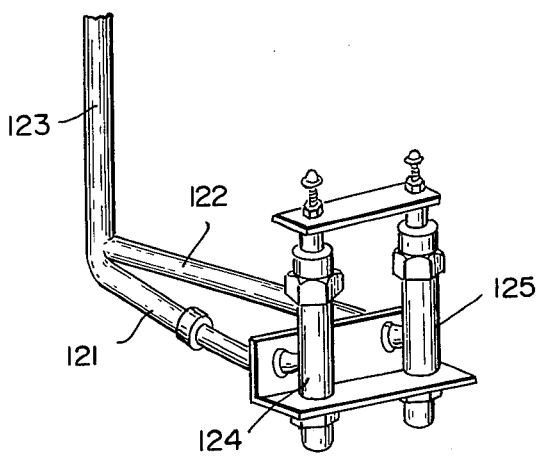
FIG. 6a is a modification of a detail of FIG. 6.
Figure 6:
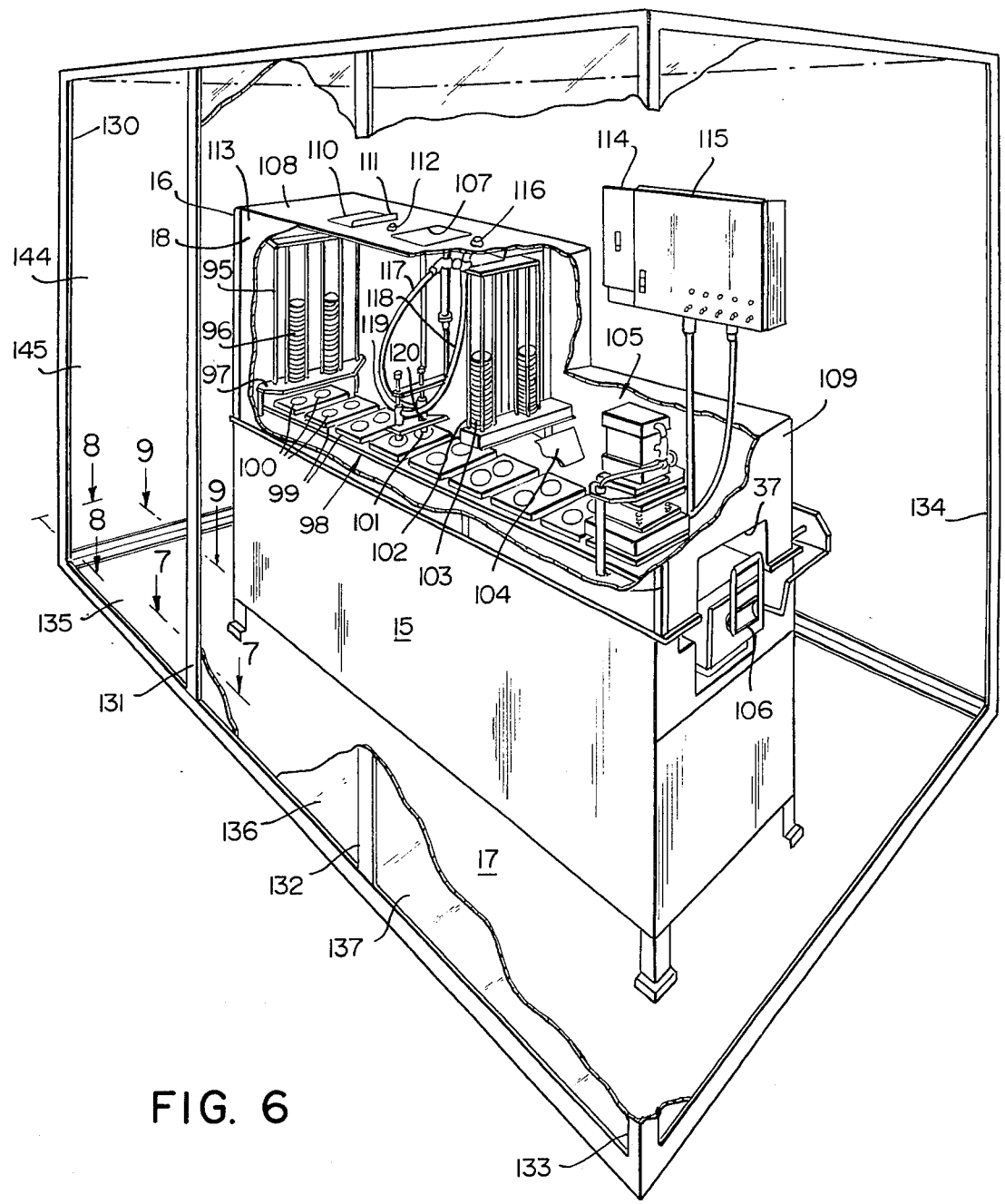
FIG. 6 is a perspective view of a filling machine disposed in the clean room with parts of the construction broken away and, for clarity, parts omitted.

In FIG. 6 is shown the filling machine 15 in detail as it is disposed in the clean room 17. Certain operations of the machine, as described, are conventional, including filling the preformed containers with food, capping them with precut lids, sealing the lids thereon, and discharging the sealed containers from the machine. The structures for carrying out these operations are also conventional and may be described more or less briefly. They include a holder 95 for the stacked containers 96, a depositer 97 for the containers, an intermittently movable conveyor 98 comprising a plurality of segments 99 having recesses 100 for receiving and holding the deposited containers, a valved food discharge tube assembly 101 for accurately filling the containers with food, a holder 102 for the stacked precut lids 103, a lid depositer partially shown at 104, heat and pressure sealing means 105 for sealing the lids on the containers, and off-loading means 106 for removing sealed containers from the machine.

In combination with the foregoing structures, the invention provides a number of improvements the purpose of which is to enable the containers to be filled with food under strictly aseptic conditions. These improvements include the transparent cover or shroud 18 which rests over and encloses the filling zone 16. The cover has an opening 107 in its top wall 108 through which the conduit 33 (FIG. 1) communicates with the filling zone, enabling microorganism-killing solution to flow into the zone from nozzle 32 followed by filtered sterilized air. A second opening 37 is formed in the end wall 109 of the cover at the container discharge end of the filling machine and allows air to pass out of the zone as well as finished containers. The location of the openings 107 and 37 provide for the establishment of a stream of air through the zone effective to remove any particulate matter, including microorganisms, from the atmosphere of the zone. In particular, the air stream flows past the food discharge tube assembly 101. Adjacent opening 107 is a closable opening 110 through which, as described, an attendant for the machine may introduce to the filling zone stacks of pre-sterilized containers and lids. These stacks are preferably enclosed in sealed transparent flexible plastic bags or sleeves, as described below. Opening 110 may be closed by the moveable slide 111. If spray nozzle 25 (FIG. 1) is used to sterilize the filling zone, as is preferred, an inlet sleeve 112 is provided for this purpose in the top wall 108 of the cover.

Another improvement comprises the flexible gloves 39 (FIG. 1) in the side wall 113 of the cover, each glove being sealed to the wall margins of an opening 38 through which each glove extends, as described. A further improvement resides in keeping the inner surfaces of cover 18 flush and smooth and free of holes, bolt heads, screw heads and the like, in order to reduce or avoid any tendency of microorganisms to deposit on such surfaces.

A conventional variable speed control is shown at 114 and a conventional control panel at 115.

At 116 is a food inlet opening through which the food transfer line 20 (FIG. 1) may extend for connection to the food discharge tube assembly 101. Inlet 116 connects to a Y-shaped fitting, not shown, which passes food to the flexible transfer lines 117, 118 which in turn pass the food to the dispensers or filler valves 119, 120. In this connection, a more preferred food discharge tube assembly is shown in FIG. 6a wherein the flexible lines 117, 118 of FIG. 6 are replaced by non-flexible lines 121, 122, of stainless steel. Line 123 is connected to the inlet opening 116 of FIG. 6. The entire assembly of FIG. 6a, including the dispensers 124, 125, are made of stainless steel, the purpose being to enable the assembly to be sterilized by passing through it hot water at 285°F. and 26 p.s.i.g. This water is preferably passed through the assembly for about 5 minutes, during which period the assembly itself attains a temperature of about 285°F. With flexible feed lines, such a temperature may prove too high and lead to damage. Following the hot water flush, cooler water is passed through the assembly until the temperature approximates that of the food to be processed. Alternatively, if desired, the assembly may be steam sterilized, using steam at 375°F. and 20 to 40 p.s.i.g. for 15 minutes; or it may be sterilized by means of a blast of air at 600°F. for 3 to 4 seconds directed on the external surfaces thereof so that the assembly attains a temperature of about 300°F.; or a microorganism-killing solution, comprising water containing 100 p.p.m. of hydrogen peroxide, may be passed through the assembly followed by an external blast of air at 600°F. to break down the peroxide to water and oxygen. Besides stainless steel, the assembly may be formed of other metals resistant to heat, hot air, hot water, steam, hydrogen peroxide, and the like.

Figure 8:
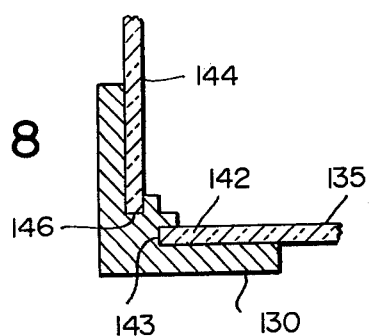
FIGS. 7, 8, and 9 are sections along ines 7—7, 8—8, and 9—9 of FIG. 6.
Figure 7:
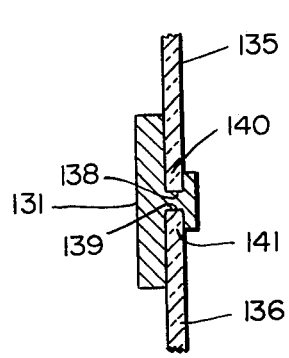

As shown in FIG. 6, the walls of the clean room 17 are formed of spaced upright members 130, 131, 132, 133, 134, etc. which may be of aluminum or other suitable material. Between each pair of adjacent members a panel 135, 136, 137, etc. is supported which is preferably of a transparent material such as fairly rigid plastic or glass. The panels are held in channels formed in the upright members; note FIG. 7, where the upright member 131 is formed with a pair of channels 138, 139 which respectively support the longitudinal edge portions 140, 141 of the panels 135, 136. As shown in FIG. 8, the opposite edge portion 142 of panel 135 is supported in a channel 143 of the corner upright member 130; and a panel 144 of end wall 145 is shown supported in the channel 146 of member 130. It will be understood that all walls of the clean room are formed in the above-described manner, including the ceiling and the anteroom. While the showing in FIGS. 7 and 8 presents the panels as fitting snugly in the channels, actually the fit is looser, so that when the clean room is pressurized, as described below, the panels are simply moved against the upright members, thereby sealing the room. However, if the pressure in the room appreciably exceeds the low level set forth, i.e., about 0.5 p.s.i.g. or less, the panels yield a bit at their junctions with the upright members and leak out air, thereby to avoid any possible damage and to prevent any excessive pressure build up in the room.

Figure 9:
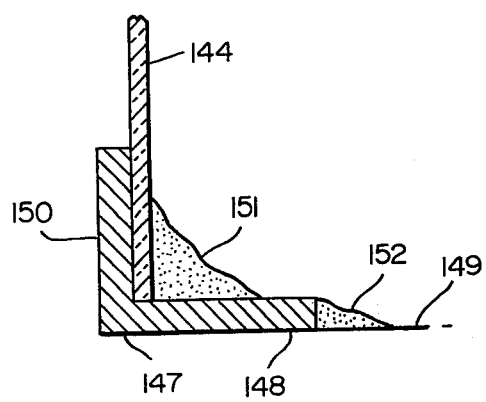

In FIG. 9 is illustrated a way of sealing the clean room with respect to the floor. A right-angled member 147 has an arm 148 that rests on the floor 149, while its other arm 150 supports the bottom edge portion of the panel 144. Seals at 151 and 152 are provided by means of any suitable adhesive or cement, such as a plastic silicone rubber type, that is deposited from solution. On drying, the seal 152 serves to "weld" the member 147 to the floor, and the panel 144 is "welded" to the arm 148.

With the flow diagram of FIG. 1 in mind, some indication of the quantitative operation of the method may be given. Starting with the spray solution, this may contain 50 to 500 p.p.m., preferably 50 to 200 p.p.m., of microorganism-killing agent, and it may be introduced to the mixing chamber 55 at a pressure of 25 to 150, preferably 50 to 100, p.s.i.g. through a mixing orifice, not shown, in the chamber of a diameter of 0.001 to 0.02, preferably 0.005 to 0.01, inch. Air may be introduced to chamber at a pressure of 25 to 150, preferably 50 to 100, p.s.i.g. The pressurized solution is introduced to the clean room over a time period of 10 to 50, preferably 10 to 20, minutes during which a film of solution is deposited of a thickness of 0.0005 to 0.01, preferably 0.001 to 0.005, inch. This film contains about 25 to 150, preferably 50 to 100, p.p.m. of microorganism-killing agent and is effective to kill microorganisms during the filling operation. Spray solution is introduced to the filling zone through a spray orifice of a diameter of 0.0001 to 0.02, preferably 0.005 to 0.01, inch.

The air filter 29 is effective to remove from the air passing therethrough solid particles of a diameter down to 0.1 micron, and preferably down to 0.05 micron. Filtered presterilized air may pass through the clean room at a volume of 500 to 1500, preferably 700 to 900, cu. ft./min., this being on a basis of a clean room measuring about 20 ft. long by 10 ft. wide by 8 ft. high. The clean room, of course, may have any suitable dimensions, and the air rate may be adjusted thereto. Air pressure maintained in the clean room may range from 0.01 to 0.5, preferably 0.05 to 0.1, p.s.i.g. In the filling zone the air volume passing through may range from 300 to 900, preferably 400 to 800, cu. ft./min. on the basis of a filling zone measuring about 6 ft. long by 3 ft. wide by 3 ft. high. Air pressure in the filling zone may range from 0.1 to 0.6, preferably 0.1 to 0.3, p.s.i.g., and should always be higher than the pressure in the clean room, say at least 0.1 p.s.i.g. higher. Humidity in the clean room may vary from 40 to 80%, preferably 50 to 70%. When not in use, the moving conveyor of the filling machine may be flushed with a microorganism-killing solution containing about 25 p.p.m. of microorganism-killing agent at a pressure of about 15 p.s.i.g.

The preferred microorganism-killing agent is an organic iodinecontaining complex which provides at least 0.5 or 1 percent available iodine, of which a particular example is known as "Mikroklene DF" (registered trademark of product made by Klenzade Products) comprising as active ingredients 15.5 percent butoxypolypropoxy polyethoxy ethanol-iodine complex, which provides 1.75 percent available iodine, and 6.5 percent phosphoric acid; and 78 percent inert ingredients. This agent is effective during spraying and also leaves a microorganism-killing residue. Other useful iodine-containing agents inlcude thymol iodide and iodoform, both suitable for use as sprayable powders; and iodoxybenzoic acid for use as a dilute spraying spraying solution. Other agents include dilute aqueous solutions of cresol, a mixture of cresols, cresylic acid, resorcinol, and hexylresorcinol; also dilute aqueous solutions of quaternary ammonium compounds like benzalkonium chloride, benzethonium chloride, cetyl pyridinium chloride; also dilute aqueous solutions of other chlorine-containing agents like chloramine-T (sodium p-toluene-sulfonchloroamide), azochloroamid (alpha, alpha'-azo-bis(chloroformamidine)), dichloroamine-T, N-chlorosuccinimide; also dilute aqueous solutions of mercury-containing compounds such as the sodium salt of the anhydride of 4-nitro-3-hydroxymercuri-orthocresol (Metaphen), and certain phenylmercuric compounds. By "dilute solution" is meant a solution containing up to about 5 percent of agent, preferably up to 1 or 2 percent. Aqueous solutions of chlorine and of hydrogen peroxide are of use. Mixtures of two or more agents may be suitably employed. As indicated, the preferred agents are those which are not only effective during spraying but which also leave a microorganism-killing residue; and to help achieve the latter result, it may be desirable with some agents to add an amount of powdered iodine or powdered iodine-containing compound. It will, of course, be understood that the microorganismkilling agent does not find its way into the food or the food containers.

The term "microorganism" is intended to include bacteria, molds, yeasts, and fungi.

As indicated, the food to be aseptically packaged according to the invention is one that is flowable. The full advantages of the invention may be realized when the selected food is one that is perishable by microbial action or by oxidation, whether or not the food is refrigerated. Dairy products comprise a class of foods that may be particularly benefited, such as whole milk, non-fat milk, evaporated condensed milk, chocolate-flavored milk, malted beverages, light and heavy cream, sour cream, buttermilk, skim milk, egg nog, etc. Fats and oils are suitable, such as salad oil, cooking oil, fish oil, coconut oil, peanut oil, corn oil, peppermint oil, oil components, etc. Fruit juices in general are suitable for treatment, and also fruit drinks, cola beverages, ginger ale and other soft drinks, beer, wine, other alcoholic drinks, liquid flavors, and the like. If ground sufficiently fine to make them free flowing, farinaceous products, flours, and meals may be treated, and also other powdered foods like sugar, starch, cocoa, eggs, gelatin, dried yeast, pectin, coffee, various dry mixes, and the like. Foods that are more or less viscous may be capable of being processed, such as chocolate syrup, honey, sugar syrup, apple butter, molasses, jams, jellies, gravies, entree flavored gels, sauces, bouillon, broth, soup, gruel, purees, toppings, puddings, icings, synthetic coffee creams, mayonnaise, etc. In connection with the more vicous materials, and also those containing or comprising solids, it may be advisable to sterilize them by a method other than that shown in FIG. 2 which involves the passage of the food through considerable lengths of tubes; including coils. Thus, these foods may be sterilized by heating them in buld form, with agitation; or they may be heated in fluidized form using an inert fluidizing gas; or they may be heated in scraped surface indirect heat exchangers.

The invention is applicable to a variety of containers and container lids consistent with the requirement that the sealed containers are effective to keep out microorganisms, air, water, water vapor, etc. A particularly useful container is one made of aluminum or a high aluminum alloy. Othes may be made of plastic, of which many kinds of plastic are suitable. The lids may also be chosen from a variety of materials and constructions; one preferred type comprises a layer of aluminum foil or sheet laminated between a layer of paper and a layer of an adhesive such as polyvinyl chloride or a derivative thereof. The adhesive layer is preferably sealable to the container by means of heat and pressure.

The invention may be illustrated by the following examples.

EXAMPLE 1

As preparation for the aseptic packaging of whole mile, as purchased from the dairy, the sterilizing apparatus shown in FIG. 2 was subjected to sterilization by adding water to tank 82, opening valve 82a, and pumping the water through the heat exchange units. The water was heated in the preheater and heater units, and the heated water, at 300°F., was passed through the holding, precooling, and final cooling units to sterilize the same. No cooling water was used in the cooling units for heat exchange during sterilization. Heated water was also passed through the homogenizing valve, and through line 13, tank 14, line 20, and the filling tubes 19 to sterilize the same.

Microorganism-killing agent, described above as the organic iodine-containing complex trademarked "Mikrolene DF", was charged to tank 46 (FIG. 1). Using tap water from line 50, the proportionometer 49 was adjusted to form an aqueous solution containing 82 p.p.m. of the agent, and the solution was passed to pressurized chamber 55 where it was entrained by incoming air from lines 56 and 57 having a pressure of 87 p.s.i.g. and then passed out of the chamber through an orifice mixer having a diameter of 0.008 inch. The resulting pressurized mixture was sprayed into the clean room over a period of 14 minutes. During this time period the pressure in the clean room was reduced to 0.01 p.s.i.g. by closing the automatic motorized air inlet damper at 89, thereby to allow the spray or fog to disperse readily throughout the room and to build up its concentration therein. To aid the spraying operation, high-pressure air at 87 p.s.i.g. was introduced to the solution spray nozzle as an atomizing aid.

At the same time the air duct 33 was sprayed with the same solution, using a nozzle having an orifice or 0.006 inch. This action served to sterilize the filling zone of the filling machine as well as duct 33 and was carried out for 14 minutes. Similarly, the air filter was sprayed.

By test, the thickness of the film deposited on the surfaces of the clean room was measured and found to average about 0.001 inch and to contain about 55 p.p.m. of agent.

The flexible gloves (note 39 of FIG. 1) were sterilized by adding to them a microorganism-killing solution containing not less than 25 p.p.m. of agent and allowing the solution to remain for at least 14 minutes. If desired, the solution can remain in the gloves overnight. The gloves were then inverted so that the solution discharged into the filling zone, from which it drains away.

At the end of the spraying operation, atmospheric air was passed through the air filter by the blower disposed therein and supplied to the clean room and duct 33. The filter removes from the incoming air all particles having a diameter as low as 0.1 micron. In this connection it may be recalled that the average length of bacteria is about 1.5 microns and the average thickness may vary from 0.2 to 1 micron. The inlet air register (note 35 of FIG. 5) was adjusted beforehand to direct air into the clean room in a direction aimed at the opening 36 (FIG. 1). By adjusting the louvers in the register, the air volume delivered to the clean room was set at about 800 cu. ft./min. The damper closure 36a was set to permit a pressure of 0.05 p.s.i.g. in the room.

Air entering the filling zone 16 through duct 33 was controlled by the damper 87 (FIG. 4) so that the air pressure in the zone was about 0.1 p.s.i.g. greater than that in the clean room. The air flow through the zone was set at about 600 cu. ft./min., and the flow was directed about one-eighth inch above the top of the preformed containers as they were positioned in the moving conveyor of the filling machine and just as they were about to be filled with food. Air leaving the zone passed through the opening 37 (FIG. 1) in the product discharge end of the machine.

The clean room was kept at a relative humidity of about 60 percent by adjusting the temperature of the air as it passed through the air filter.

A stack of presterilized containers encased in a sealed polyethylene sleeve was introduced to the filling zone through the opening 110 (FIG. 6). The stack was removed from the sleeve and positioned on the container support by means of the glove box technique, comprising using the presterilized gloves 39 (FIG. 1). These gloves of flexible polyethylene were 35 inches long and were sealed to the margins of the openings 38 by means of tightly secured plastic rings. During removal of the stacked containers from the sleeve, the attendant with one hand holds the top of the sleeve as it extends through opening 110, and with his other hand engaging a polyethylene glove, he unties the bottom of the sleeve and allows the stack of containers to fall into the support. In a similar way, a stack of presterilized lids was introduced into the filling zone. Both the stacked containers and the stacked lids had been presterilized over a period of 9 hours in the same polyethylene sleeves containing ethylene oxide.

The containers were of aluminum and had an open mouth of 3 inches diameter and a depth of about 1⅜ inches. The lids were laminations comprising a layer of aluminum foil interposed between a layer of paper and a layer of polyvinyl chloride derivative. The paper was cut from 40 pound bleached paper. The polyvinyl chloride was the adhesive.

With the stacked containers and lids in place, and air flowing through the clean room and filling zone, tank 70 (FIG. 2) was charged with milk. Valve 70a was opened and the milk passed to preheater 73 by pumps 71 and 72. The mild was preheated to about 200°F. in preheater 73, heated to 300°F. in heater 74, held at the latter temperature in unit 75 for 4 seconds, and then cooled in units 76 and 77 to 40°F. It was delivered to tank 14 to fill the latter about one-fourth full, and then by adjustment of suitable valves (not shown) adjacent the tank was passed to the filling means, note 19 in FIG. 1, of the filling machine. With the machine in operation, the containers were intermittently advanced through the filling zone, being filled, capped, sealed, and off-loaded as described above. The finished filled containers were discharged from the clean room through the slide-covered opening 41 (FIG. 1), received on the moving conveyor 43, and temporarily stored on platform 45. In the sealing step, the heat-sealing head of the filling machine advances automatically toward each lid-covered container as it is supported on the conveyor flight. The head was at a temperature of about 550°F. and exerted a pressure on the covered container of about 1500 pounds for about 6/10 seconds, after which the head automatically retracted.

During the filling operation, the conveyor flights (note 99 of FIG. 6) on their return travel were constantly flushed with a microorganism-killing solution containing 25 p.p.m. of the above described agent at 15 p.s.i.g.

The finished containers had a strength capable of withstanding a vacuum of at least 20 inches of water, as determined by test. In other words, sealed containers placed in an evacuated covered bell jar withstood an applied vacuum of 20 inches of water without having the seal between the lid and the container broken. A seal of such strength is considered adequate for all practical purposes.

The foregoing run was carried out over a period of 10 to 15 minutes, during which time hundreds of finished containers were produced. A number of such containers were stored under incubation conditins (100°F.) for a period of 3 months and then cell counts were made; these showed zero cells to be present. The original milk charged to the process had a cell count of 100,000; while the aseptically packaged milk, tested immediately after it was packaged, had a zero count. These tests were made according to a standard plate count method, as reported in "Standard Methods." It will be appreciated that a 3-month storage period is far longer than would be encountered in commercial practice; it was chosen to demonstrate the extreme cell-free life of the aseptically packaged food. In the case of whole milk, at least, such a storage period, prior to use, while not harmful, is not preferred.

EXAMPLE 2

A chocolate-flavored pudding was packaged in substantially the same manner as set forth in the preceding example, with a few exceptions noted herein. The pudding comprised 70 percent water, 15 percent sugar, 8 percent powdered milk, 3 percent vegetable fat, 2 percent dextrose, 1.7 percent cocoa, 0.2% emulsifier, and 0.1% salt, and was in the form of a viscous liquid material. It was mixed at 70°F., heated to 140°F., homogenized at 2000 p.s.i.g., and delivered to a holding tank. In order to sterilize it, the pudding was pumped through a swept wall heat exchanger where its temperature was raised to 300°F. in about 20 seconds, then passed to a holding tube and held at 300°F. for about 12 seconds, and thereafter cooled in a swept wall cooler 100°F. The cooling step required about 40 seconds. The pudding was then passed to the surge tank 14 (FIG. 1) for delivery to the filling machine. It was packaged in aluminum containers in the manner described in Example 1 and then stored for a period of about two weeks. On examination after storage, the cell count was 0, as compared to a minimum count of 100,000 for the original unpackaged pudding. The mouth feel of the packaged pudding was improved over the original, probably as a result of the homogenization; and in other respects the pudding was normal. It had a viscosity of 12,000 cps. as measured in a Brookfield viscometer.

Generally speaking, it is preferred to sterilize the food just prior to the packaging of the same, as illustrated in FIG. 1, and the use of heat is a preferred way of carrying out the sterilization. However, other sterilizing methods may be used. It is also feasible to package presterilized food, i.e., food that has been sterilized at a different time and/or place, in which case the food is simply added to the surge tank 14 by means not shown, taking care to preserve aseptic conditions. Use of gravity flow to move the food from the surge tank to the filling machine is feasible.

It will be understood that in commercial practice the process will be operated continuously, although batch operation is not precluded.

Besides whole milk and puddings, as illustrated above, other packaged foods have been produced having a shelf life of up to several months, without refrigeration; conventionally, these same foods require refrigeration. It is considered that the shelf life of these aseptically packaged, non-refrigerated foods may be at least twice as long as that of the refrigerated non-sterile food and may range up to 50 or 100 or more times longer. The packaged food is also protected against oxidation by atmospheric oxygen. The invention makes it possible to avoid the use of conventional chemical preservatives; and reconstituting of food products may be eliminated. Refrigeration costs can be reduced.

Other materials besides foods may be aseptically packaged according to the invention, either in the form of liquids, or flowable powders, or flowable granular materials. These include materials that are of use in medicine, such as hematic materials like whole blood, thrombin, other blood components; also various serums like blood plasma, globulin, albumin, antitoxic serums, and antitoxins; also vaccines like rabies vaccine, bacterial toxins, bacterial vaccine, and various toxins for use as diagnostic agents. Also suitable for packaging are various pharmaceutic and therapeutic aids like gelfoam (absorbable gelatin sponge), fibrin foam, cellulosic materials, dusting powders, medicinal foods, etc. Vitamins are suitable, and also biological materials, animal extracts, animal organ extracts, vegetable extracts, and the like. Medicines and drugs in general may be packaged, and also chemicals of all types and kinds for use wherever there is a need for aseptically packaged materials.

In regard to the physical form of the solid materials, powders and granular materials may be processed provided that they are flowable under the force of gravity or a pump. This of course applies to foods as well, and it should be noted that granular foods, such as various nuts, either whole or chopped, may be packaged provided they are flowable.

The invention is capable of obvious variations without departing from its scope.

In the light of the foregoing description, the following is claimed.

1. A method for the production of an aseptic packaged food product which comprises disposes a filling maching having a covered filling zone in a completely walled pressure-sealed clean room, spraying the atmosphere and all surfaces of the clean room and of said filling zone with a liquid solution of a microorganism-killing agent for a time long enough to kill all microorganisms present, and maintaining said agent on said surfaces throughout the course of said method; then flowing filtered presterilized air through the clean room in a path across outer surfaces of said machine and over and past an operator adjacent thereto, thereby picking up any microorganisms from the operator and carrying the same away from the machine, removing said air through a closable opening in the room, flowing filtered presterilized air through said covered filling zone and removing the same from the product discharge end of the machine and from said room, maintaining air pressure in said room at a slightly superatmospheric value to prevent entry of microorganisms from the atmosphere outside the clean room, maintaining air pressure in the filling zone higher than in said clean room, and continuing said air flows as long as the operator attends said machine; coincidently with said air flows, flowing said food product through a heating zone, heating the food therein at a temperature sufficiently high and for a time sufficiently long as to kill microorganisms contained therein, flowing the sterile food through a presterilized cooling zone, flowing the cooled food to said filling machine in the clean room, aseptically introducing a stack of presterilized containers and a stack of presterilized container lids to said filling zone of the machine, aseptically filling each container with sterile food and capping and sealing the same in said machine, and removing sealed containers from the machine and from the clean room through a closable exit in the latter while maintaining the air pressure therein at said superatmospheric value; said food product in the nonsterile state being perishable if not refrigerated, and said sealed containers of sterile food product being storable without refrigeration for a period of time at least twice as long as the storage period of the refrigerated non-sterile food.

2. Method of claim 1 wherein said microorganism-killing solution is one which, on evaporation, leaves said agent as a solid residue which is also effective to kill microorganisms.

3. Method of claim 2 wherein said agent is an organic iodine-containing complex which produces available iodine.

4. Method of claim 1 wherein said filtered presterilized air flows through the clean room in a descending diagonal path and leaves said room adjacent the bottom thereof.

5. Method of claim 1 wherein said clean room is sufficiently airtight as to maintain therein said slightly superatmospheric pressure but will permit air to leak out, in conjunction with said closable opening, when the pressure appreciably exceeds said slightly superatmospheric value.

6. Method of claim 1 wherein said containers and lids are presterilized at a location remote from said filling zone.

7. A method for the production of an aseptic product in a covered filling zone of a filling machine disposed in a pressure-sealed clean room which comprises applying to the atmosphere and the surfaces of the clean room and the filling zone a liquid solution of a microorganism-killing agent to kill all microorganisms present, and maintaining said agent on said surfaces throughout the course of said method; then flowing filtered presterilized air through the clean room across said machine and over and past an operator for said machine, thereby picking up any microorganisms and carrying the same away from the machine, removing said air from said room, flowing filtered presterilized air through said filling zone and removing the same, maintaining air pressure in the clean room at a slightly superatmospheric value to prevent entry of microorganisms, maintaining air pressure in the filling zone higher than in said clean room, and continuing said air flows as long as the operator attends the machine; coincidently with said air flows, flowing presterilized product to said filling machine, aseptically introducing presterilized containers and lids to the filling zone of the machine, aseptically filling each container with sterile product and capping and sealing the same in said zone, and removing sealed containers from the machine and from the clean room while maintaining the air pressure therein at said superatmospheric value.

8. Method of claim 7 wherein said product is a food.

9. Method of claim 7 wherein said product is one useful in medicine.

10. Method of claim 7 wherein said containers are of plastic and said lids comprise a paper and foil lamination, and wherein the lids are heat sealed to the containers.

* * * * *

UNITED STATES PATENT OFFICE
CERTIFICATE OF CORRECTION

Patent No. 3,891,779  Dated  June 24, 1975

Inventor(s)  David V. Robinson

It is certified that error appears in the above-identified patent and that said Letters Patent are hereby corrected as shown below:

| Col. | Line | |
|---|---|---|
| 1 | 62 | "ines" should be --lines-- |
| 3 | 13 | "sustantially" should be --substantially-- |
| 4 | 27 | pluralize "valve" |
| 5 | 14 | "stem" should be --steam-- |
| 10 | 4 | "vicous" should be --viscous-- |
| 10 | 9 | "buld" should be --bulk-- |
| 10 | 65 | "or" should --of-- |
| 12 | 41 | "conditins" should be --conditions-- |
| 13 | 2 | "to" should precede --100°F.-- |

Signed and Sealed this eighteenth Day of November 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,891,779      Dated June 24, 1975

Inventor(s) David V. Robinson

It is certified that error appears in the above-identified patent and that said Letters Patent are hereby corrected as shown below:

On the Title Page Item 62, and Column 1, line 3, cancel "abandoned" and insert -- Patent No. 3,643,586 granted Feb. 22, 1972. --.

Signed and Sealed this thirteenth Day of January 1976

[SEAL]

Attest:

RUTH C. MASON
*Attesting Officer*

C. MARSHALL DANN
*Commissioner of Patents and Trademarks*